United States Patent [19]

Schartau et al.

[11] 4,102,692

[45] Jul. 25, 1978

[54] REINFORCING GLASS FIBERS OF MGO-CAO-ZNO-AL$_2$O$_3$-SIO$_2$-TIO$_2$

[75] Inventors: Wolfgang Schartau, Odenthal-Hahnenberg; Friedrich Schwochow, Leverkusen, both of Germany

[73] Assignee: Bayer Aktiengesellschaft, Leverkusen, Germany

[21] Appl. No.: 693,042

[22] Filed: Jun. 4, 1976

[30] Foreign Application Priority Data

Jul. 23, 1975 [DE] Fed. Rep. of Germany ....... 2532842

[51] Int. Cl.$^2$ .................... C03C 13/00; C03C 3/04; C04B 31/06

[52] U.S. Cl. ............................. 106/50; 106/52; 106/99

[58] Field of Search ......................... 106/52, 99, 50

[56] References Cited

U.S. PATENT DOCUMENTS

| | | | |
|---|---|---|---|
| 2,961,328 | 11/1960 | Babcock et al. | 106/52 |
| 3,218,262 | 11/1965 | de Lajarte | 106/52 |
| 3,459,568 | 8/1969 | Rinehart | 106/52 |
| 3,673,049 | 6/1972 | Giffen et al. | 106/50 |
| 3,687,850 | 8/1972 | Gagin | 106/50 |
| 3,736,162 | 5/1973 | Chvalovsky et al. | 106/52 |
| 3,847,627 | 11/1974 | Erickson et al. | 106/50 |
| 3,901,720 | 8/1975 | Majumdar | 106/50 |
| 3,904,423 | 9/1975 | Guthrie | 106/50 |

*Primary Examiner*—Winston A. Douglas
*Assistant Examiner*—Mark Bell
*Attorney, Agent, or Firm*—Burgess, Dinklage & Sprung

[57] ABSTRACT

Glass fibers of superior physical properties are produced by drawing at a temperature between about 1200° and 1300° C a melt consisting essentially of MgO-CaO-ZnO-Al$_2$O$_3$-SiO$_2$-TiO$_2$ of the following approximate molar composition:

| | |
|---|---|
| MgO | 7–27.5 % |
| CaO | 4.5–32.5 % |
| ZnO | 3–15 % |
| Al$_2$O$_3$ | 5–13.5 % |
| SiO$_2$ | 36–56 % |
| TiO$_2$ | 0–9 % |

The fibers are especially suited for use as a reinforcement in a plastic, plaster, cement or low-melting metal structure.

3 Claims, No Drawings

REINFORCING GLASS FIBERS OF MGO-CAO-ZNO-AL$_2$O$_3$-SIO$_2$-TIO$_2$

The present invention relates to glasses, which are free from alkali, boron and fluorine, of the MgO-CaO-ZnO-Al$_2$O$_3$-SiO$_2$-TiO$_2$ system, which are suitable, at a relatively low fiber-drawing temperature, for the production of reinforcing fibers with a high elastic modulus, such as are required for use in glass fiber-reinforced organic and inorganic composite materials.

Hitherto, fibers of a glass which is substantially free from alkali and which is composed of oxides of silicone, aluminum, calcium and magnesium with additions of boron oxide and calcium fluoride as fluxing agents, and which has been disclosed under the designation "E-glass", have been employed, in the main, in composite systems of this type, especially in glass fiber-reinforced plastics.

However, the mechanical properties, especially the elastic modulus, of the customary E-glass fibers no longer meet the requirements for many fields of application in which increased stiffness of the composite materials is demanded.

A further disadvantage is the possible pollution of the environment when E-glass is melted, because boron and fluorine can escape in the form of volatile compounds. It is true that the losses of volatile fluxes can be substantially reduced by means of suitable installations, but measures of this type are complicated and costly. Since, in addition, boric acid, the content of which in the E-glass mixture is relatively high, is, in particular, a raw material which is in short supply and expensive, glass compositions which are free from boron and fluorine and which are intended to be used as reinforcing fibers have already been proposed.

Glasses of this type, for example of the MgO-CaO-Al$_2$O$_3$-SiO$_2$ system (for example German Published Specification DOS 1,596,751) are, however, considerably more difficult to fuse than E-glass. Moreover, they have a fiber-drawing temperature of 1,380° to 1,430° C, which is about 200° C higher than that of E-glass, and due to this the bushings which consist of a platinum-rhodium alloy are subjected to severe stress and frequently have to be replaced or repaired. The elastic moduli of these fibers which are free from B$_2$O$_3$ and fluoride are only slightly above those of E-glass.

Glasses of the MgO-ZnO-Al$_2$O$_3$-SiO$_2$ system, which can also be drawn to glass fibers, are known according to German Patent Specification 2,129,016. However, for such glasses the viscosities required for the fiber-forming state can be achieved only at a high temperature of about 1,400° C and in a short time can lead to the noble metal bushings becoming useless.

Furthermore, glasses which, in addition to the main constituents SiO$_2$, Al$_2$O$_3$ and CaO, must also contain small percentages of a multiplicity of other oxides, are also known for the production of fibers which have been proposed as a substitute for E-glass fibers (for example German Published Specification DOS 2,320,720). At a viscosity required for the fiberization process, these glasses also require comparatively high bushing temperatures of 1,310° to 1,340° C. Nevertheless, the mechanical properties of the resulting fibers are not decisively improved compared with those of E-glass fibers.

Glass compositions which are free from boron and fluorine and which are used mainly for the production of glass ceramic materials are also described in the literature.

Thus, according to German Patent Specification 1,045,056, glasses which, for example, have, in addition to the basic constituents SiO$_2$ and Al$_2$O$_3$, relatively high contents of zinc oxide and, at the same time, relatively small proportions of oxides such as, for example, CaO or MgO, are suitable for the production of glass ceramics. These glasses can be converted easily into the crystalline state, sufficient amounts of so-called nucleating agents additionally being admixed. In the main TiO$_2$ and ZrO$_2$ can be used for this purpose. In accordance with their intended use, glasses of such a composition have an extremely high tendency to devitrify. Due to the high tendency to crystallization, these glasses are generally difficult to fiberize and the resulting filaments have a high brittleness.

Finally, glass compositions which are free from boron and fluorine are known which can exhibit an increased elastic modulus and a comparatively high hardness and can be used, for example, for transparent shieldings. Glasses of this type consist of the following groups of oxides: SiO$_2$; Al$_2$O$_3$ or RE$_2$O$_3$ (or mixtures); ZnO, BeO or ZrO$_2$ (or mixtures); MgO, CaO, BaO or SrO (or mixtures). Such glasses also have an extraordinarily high tendency to crystallization so that they are hardly suitable for the production of glass fibers.

It is thus the object of the present invention to provide glasses which are suitable for the drawing of textile glass fibers which can be used as reinforcing fibers for synthetic resins and inorganic materials. In addition, however, it is also intended that the fibers be suitable for use for the production of flameproof textiles, for the production of fabrics of high strength or as insulating materials.

It is also an object of the present invention to provide glasses which are free from alkalis, boron oxide and fluorides.

Furthermore, the glasses according to the invention should exhibit a comparatively good fusibility of the raw material mixture.

A further object is to provide glasses which can be fiberized at relatively low temperatures. It is, in particular, an object of the present invention to provide glasses which, at the drawing temperatures suitable for the production of fibers, possess no tendency to devitrify and have a sufficiently wide fiberization range.

An essential aim of the invention is also that the glass fibers produced from the glasses according to the invention possess a high elastic modulus which exceeds that of the reinforcing fibers known hitherto; in addition, the fibers should also exhibit relatively good tensile strengths.

These requirements are met by the glasses according to the invention which consist essentially of the components magnesium oxide, calcium oxide, zinc oxide, aluminum oxide, silicon oxide and titanium oxide. The glasses according to the invention are characterized in that they have the following approximate composition:

|  | in mole % | in % by weight |
| --- | --- | --- |
| MgO | 7 – 27.5 | 4 – 18 |
| CaO | 4.5 – 32.5 | 4 – 30 |
| ZnO | 3 – 15 | 3.5 – 20 |
| Al$_2$O$_3$ | 5 – 13.5 | 8 – 21.5 |
| SiO$_2$ | 36 – 56 | 34 – 52.5 |

| | in mole % | in % by weight |
|---|---|---|
| TiO$_2$ | 0 – 9 | 0 – 11 |

The glasses according to the invention possess working properties which are similar to or approximately as good as those of E-glass and in particular they have low spinning temperatures of ≦1,300° C and exhibit virtually no devitrification at the temperatures advantageous for the fiberization process. Therefore, according to the object, the glasses according to the invention, are outstandingly suitable for use in the technically exacting bushing process for the production of high quality reinforcing glass fibers. The fibers produced from these glasses have an elastic modulus which is up to 70% higher than that of E-glass fibers and have very good tensile strengths.

Furthermore these glass fibers have increased alkali resistance as compared to E-glass fibers, so that they are well suited as reinforcement materials for cement mouldings or concrete.

It is assumed that the excellent properties of the glasses according to the invention are due to the selection of the oxide constituents and in particular due to the novel composition of their constituents with regard to their mode of action in the glass, which composition was not known hitherto and is extreme with regard to the glass state.

Thus, in contrast to the state of the art, it has been found, surprisingly, that, in the present system, the glasses have high elastic modulus values, especially when the ZnO content is relatively low, that is to say less than about 15 mole %.

It is presumed that the unexpectedly advantageous effect of these relatively low ZnO contents is due to the combination, according to the invention, of the ZnO with the unusually high proportions of CaO and MgO. Preferably, the sum of MgO and CaO should be greater than about 25 mole %; contents of about 30 to 40 mole % are particularly advantageous. According to the state of the art, very unfavorable fusion conditions and a high tendency to devitrify would have been expected for glasses which have such high proportions of the high-melting oxides MgO and CaO, relative to the SiO$_2$ content. It was to be expected that such glasses would be completely unsuitable for the production of fibers. It was therefore completely surprising that it is precisely by means of the composition, according to the invention, of the SiO$_2$, Al$_2$O$_3$ and ZnO contents claimed with the exceptionally high MgO and CaO contents that glasses are obtained which have particularly outstanding fiberization properties at relatively low temperatures and outstanding fiber properties with regard to their elasticity and strength values. The fiber-drawing temperatures are not above about 1,300° C and the glasses according to the invention are highly stable to crystallization during the fiber-drawing process. The advantageous working properties of the glass compositions according to the invention are further improved by adding up to about 9 mole %, preferably about 2 to 6 mole %, of TiO$_2$. TiO$_2$ is advantageous because it acts as a flux and further reduces the spinning temperature. However, it was not to be expected that TiO$_2$, which, according to the state of the art, is frequently added precisely as a nucleating agent for ceramic glasses, assists the stability of the glasses against devitrification phenomena. TiO$_2$ can also exert a favorable influence on the elastic modulus. In preferred embodiments, the content of the flux TiO$_2$ is so selected that, together with the ZnO component, it is less than about 15 mole %.

Glass fibers according to this invention may contain other substances in concentrations of up to about 1% by weight, as these are unavoidable using accessible and inexpensively available raw materials.

It is presumed that the exceptionally good properites of the glass compositions according to the invention can be explained, at least in part, by a specific glass structure. It is possible that arrangements which were hitherto unknown and in which the magnesium, calcium, zinc, aluminum, silicon and titanium ions are arranged in the holes of the oxygen ion packing, for example in positions which have a tetrahedral or octahedral coordination, in such a way that they produce force fields providing strong bonding, are preferred in the glasses according to the invention.

The glassy solidified system has an extraordinarily rigid structure due to this and possesses a high elastic modulus. However, other explanations are also possible.

To manufacture the glasses and glass fibers according to the invention in an advantageous manner it is possible to use, as starting materials, readily accessible and inexpensively available raw materials which contain the oxides present in the glasses according to the invention. Any impurities which may be present, for example ion oxide, can, however, be present as traces without the physical properties of the glasses being reduced.

Silicon dioxide is preferably employed as quartz powder but it is also possible to use minerals which are compounds of SiO$_2$ with other necessary oxides, that is to say, for example, kaolin.

Aluminum oxide is intruduced into the batches in a more or less hydrated form as the hydroxide (for example as hydrargillite or boehmite), as the hydrated oxide or, calcined, as active alumina. Kaolin can also serve as a source of alumina. The oxides CaO, MgO and ZnO are available, for example, in the form of silicates, but preferably as carbonates, for example as lime, dolomite and zinc spar, or as their calcination products. Rutile has proved useful for providing the TiO$_2$ content, but all other forms of titanium dioxide as well as suitable titanium-containing minerals can also be used. A typical batch has, for example, the following composition:

| | |
|---|---|
| Calcined magnesite (87% MgO): | 4.6 to 20.7 parts by weight |
| Lime (54% CaO): | 7.4 to 55.5 parts by weight |
| Zinc oxide (100% ZnO): | 3.5 to 20.0 parts by weight |
| Hydrargillite (65% Al$_2$O$_3$): | 12.3 to 33.5 parts by weight |
| Quartz powder (100% SiO$_2$): | 34.0 to 52.5 parts by weight |
| Rutile (100% TiO$_2$): | 0 to 11 parts by weight |

The batch is ground and can subsequently be fused continuously or in charges, in accordance with the processes customary in the glass industry, in furnaces which are bricklined or lined with Pt metals. The furnaces can be heated either electrically or by gas burners or oil burners. In a reducing gas atmosphere, a slight brown discoloration of the glasses occurs at times; however, no adverse influence on the mechanical properties of the fibers could be detected. The fusion temperatures for the glasses according to the invention are between about 1,300° and 1,500° C, generally between about 1,400° and 1,450° C. Temperatures between about 1,300° and 1,400° C are adequate for subsequent refining of the melts.

After refining, the melts can, for example, solidify in a suitable manner to flakes, granules or marbles. The spinning of the glasses according to the invention to give fibers is preferably carried out according to the customary industrial textile fiber processes, known, for example, from the manufacture of E-glass fibers, through Pt-Rh noble metal bushings.

Fiber-drawing temperatures in the range from about 1,200° to 1,300° C are adequate. The fiber strands obtained are sized in accordance with known methods and further processed in a known manner to rovings, chopped strands and the like.

If the demands on the fibers are not so high, for example for insulating purposes, it is also possible to use steam or air-blowing processes or centrifugal processes.

Measurements of tensile strength and of elastic modulus on mono filaments are used, above all, for the investigation of the mechanical properties. For this purpose it is best to start from filaments which have been drawn from a single tip bushing, with diameters of 15 to 30 microns and which have been tested in a breaking strength testing machine. The values of the tensile strength and the elastic modulus were calculated from the particular stress-strain diagrams.

To eliminate the effect of sizing, these measurements were carried out on unsized filaments. Though it is possible in principle to cut filaments, for determining the mechanical properties, from the section between the single tip bushing and the winding tube by means of a special gripper, it requires an extraordinary effort in the case of the unsized fibers described here to obtain filaments which have a completely undamaged surface, such as would be a prerequisite for maximum strength values. Therefore a substantially equal degree of damage was tolerated in the case of all the fibers, in that the filaments were wound onto rotating drums without any special precautions and subsequently were taken off these winding tubes for the breaking strength measurements. 15 samples were tested for each glass examined. As has been found, the strength values show very little scatter with the technique of preparation employed, even though, as has been mentioned, their absolute values are substantially below the maximum achievable strengths. Thus, with regard to the particular influences in respect of the glass composition, the tensile strength data given here are comparable only relative to one another.

The examples which follow serve to illustrate further the glass compositions according to the invention and the glass fibers produced therefrom. The following starting substances were used for all the experiments:

| | |
|---|---|
| Calcined magnesite | 87% MgO |
| Lime | 54% CaO |
| Pure zinc oxide | 100% ZnO |
| Hydrargillite (Al hydroxide) | 65% $Al_2O_3$ |
| Quartz powder | 100% $SiO_2$ |

-continued

| | |
|---|---|
| Anatase or rutile | 100% $TiO_2$ |

In order to produce the glass batches, the raw materials were mixed in the proportions required according to the desired glass composition and ground. The mixture was then pre-calcined (for 2 hours) at about 900° C in chamotte crucibles and then again comminuted and ground. The glass was melted in Pt crucibles at 1,500° C (electrically heated muffled furnace). After crushing the cooled melt again, the glass was kept at 1,450° C for 4 hours in a Pt crucible for refining.

The melt was then poured onto a water-cooled stainless steel form and the glass rod thus obtained was broken, after cooling, into pieces about 1 to 2 cm in length and of about 1 $cm^2$ cross-section. About 80 to 100 g of the glass pieces were introduced into a Pt-Rh single tip bushing and melted. Before filament-drawing, the glass melts were kept at the requisite spinning temperature for 30 minutes in order to remove small gas bubbles.

The table which follows gives the following properties of the glasses according to the invention and of the glass fibers drawn from them:

T:—fiber-drawing temperature in °C The measurement was made by means of a pyrometer, at the bushing tip in each case $\phi$:—diameter of the filaments in microns E:—elastic modulus from the elongation in GPa $\sigma_T$:—tensile strength in GPa, measured on unsized filaments which were taken from the winding tube.

Table 1

Examples of the properties of glass fibers according to the invention

| Example No. | MgO | CaO | ZnO | $Al_2O_3$ | $SiO_2$ | $TiO_2$ | T | $\phi$ | E | $\delta_T$ |
|---|---|---|---|---|---|---|---|---|---|---|
| | | | (In mole per cent) | | | | | | | |
| 1 | 21.6 | 13.0 | 5.4 | 10.3 | 45.5 | 4.2 | 1280 | 19.6 | 98.2 | 1.275 |
| 2 | 18.1 | 18.2 | 3.6 | 10.3 | 45.5 | 4.3 | 1280 | 21.0 | 99.2 | 0.971 |
| 3 | 22.0 | 10.5 | 7.3 | 11.6 | 44.2 | 4.4 | 1280 | 17.4 | 114.7 | 0.726 |
| 4 | 15.0 | 16.1 | 7.4 | 11.8 | 45.2 | 4.5 | 1250 | 16.6 | 101.3 | 1.423 |
| 5 | 21.1 | 20.2 | 3.5 | 8.4 | 42.5 | 4.3 | 1260 | 24.2 | 93.5 | 1.472 |
| 6 | 11.0 | 29.1 | 7.3 | 8.7 | 39.5 | 4.4 | 1240 | 22.5 | 100.6 | 1.452 |
| 7 | 22.0 | 7.9 | 9.1 | 10.4 | 46.2 | 4.4 | 1300 | 23.6 | 109.6 | 1.197 |
| 8 | 10.8 | 23.4 | 7.2 | 5.7 | 48.6 | 4.3 | 1260 | 22.0 | 101.1 | 1.776 |

The following comparison examples show the influence of the MgO, CaO and ZnO content on the spinnability of the glasses and the properties of the filaments.

For this purpose, inter alia, glasses which have the following composition (in mole %) according to Table 2, were melted analogously to the procedure of Examples 1 to 8.

Table 2

| Comparison Example No. | MgO | CaO | ZnO | $Al_2O_3$ | $SiO_2$ | $TiO_2$ |
|---|---|---|---|---|---|---|
| | | | (in mole per cent) | | | |
| 1 | 8.0 | 5.7 | 19.8 | 11.4 | 50.3 | 4.8 |
| 2 | 7.8 | 11.3 | 19.4 | 9.3 | 47.4 | 4.8 |
| 3 | 15.4 | 5.5 | 19.0 | 9.1 | 46.4 | 4.6 |

With these comparison glasses, very extensive crystallization in the bushing was observed in the fiber-forming temperature range. However, it was possible, with great difficulty, to produce a few filaments: the fibers were of exceptionally irregular diameter and also frequently possessed knot-like thickenings with high crystal contents in the glassy matrix and were very brittle. It was very difficult to determine the mechanical values since these showed wide scatter. However, it was possible to determine that the filaments had low tensile strengths of, on average, less than 0.54 GPa, with minimum values of 0.29 GPa, which are attributed to devitrification during the fiberization process.

Furthermore, glasses which contain comparatively high proportions of ZnO and which were free from CaO and/or MgO (Comparison Example 4 and 5) were melted in accordance with the state of the art. At the requisite high fiber-drawing temperatures, the fiberization properties were not adequate for continuous production of the fibers because of the very high tendency of the melts to crystallize.

Furthermore, for comparison, glasses which contained no CaO and which were free from $TiO_2$ (comparison Example 6 and 7) were melted in accordance with the state of the art.

The influence of too high a $SiO_2$ content on the properties of the fibers can be seen from comparison Example 8.

Table 3

| Comparison Example No. | Summary of the composition and mechanical properties of the comparison glass fibers | | | | | | | | | |
|---|---|---|---|---|---|---|---|---|---|---|
| | MgO | CaO | ZnO | $Al_2O_3$ | $SiO_2$ | $TiO_2$ | T | φ | E | $\delta_T$ |
| | (in per cent by weight) | | | | | | | | | |
| 4 | 4.3 | — | 26.1 | 17.4 | 43.5 | 8.7 | 1400 | 22.0 | 80.0 | 0.412 |
| 5 | — | — | 24.3 | 14.6 | 58.2 | 2.9 | 1415 | 23.8 | 85.6 | 0.491 |
| 6 | 5 | — | 24 | 21 | 50 | — | 1375 | 29.3 | 89.8 | 0.656 |
| 7 | 7 | — | 14 | 17 | 62 | — | 1440 | 21.1 | 83.7 | 0.392 |
| 8 | 2.8 | 22.9 | 2.8 | 11.4 | 57.7 | 2.3* | 1310 | 20.0 | 82.2 | 1.295 |

* + 0,1 $Fe_2O_3$

For comparison of the mechanical properties, a customary E-glass which was composed of 54% by weight of $SiO_2$, 15% by weight of $Al_2O_3$, 5% by weight of MgO, 9% by weight of $B_2O_3$, 1% by weight of $CaF_2$, 16% by weight of CaO and 0.5% by weight of $Fe_2O_3$ and 0.5% by weight of $Na_2O$, was also melted. The glass was drawn in a known manner at 1,235° C to give fibers with a diameter of 18.6 microns. The filaments, which were unsized and taken from the winding tube in the manner described, had an elastic modulus of 70.7 GPa and a tensile strength of 0.697 GPa.

With regard to the properties required, the glasses according to the invention and the fibers produced from them are therefore considerably superior to the glass compositions known hitherto. They offer decisive advantages over the glass compositions known hitherto and satisfy all the objectives specified above.

It will be appreciated that the instant specification and examples are set forth by way of illustration and not limitation, and that various modifications and changes may be made without departing from the spirit and scope of the present invention.

What is claimed is:

1. A glass fiber consisting essentially of MgO-CaO-ZnO-$Al_2O_3$-$SiO_2$-$TiO_2$ of the following approximate molar composition:

| MgO | 7–27.5 % |
|---|---|
| CaO | 4.5–32.5 % |
| ZnO | 3–15 % |
| $Al_2O_3$ | 5–13.5 % |
| $SiO_2$ | 36–56 % |
| $TiO_2$ | [0–9] 2– 6 % | wherein the sum of the MgO and CaO contents is about 30 to 40 mole % and the sum of the ZnO and $TiO_2$ contents is less than about 15 mole %.

2. A glass according to claim 1, in the form of a flameproof textile fabric.

3. In the production of glass fibers of superior physical properties comprising drawing at a temperature between about 1200 and 1300° a glass forming melt, the improvement wherein said melt consists essentially of MgO-CaO-ZnO-$Al_2O_3$-$SiO_2$-$TiO_2$ of the following approximate molar composition:

| MgO | 7–27.5 % |
|---|---|
| CaO | 4.5–32.5 % |
| ZnO | 3–15 % |
| $Al_2O_3$ | 5–13.5 % |
| $SiO_2$ | 36–56 % |
| $TiO_2$ | 0– 9 % |

* * * * *